United States Patent [19]

Lin et al.

[11] Patent Number: 5,760,920
[45] Date of Patent: Jun. 2, 1998

[54] SYSTEM AND METHOD FOR GENERATING CALIBRATED DITHER MATRICES

[76] Inventors: Qian Lin, 159 Gilbert Ave., Santa Clara, Calif. 95051; Brian Hoffmann, 3609 Trail Cir., Boise, Id. 83704

[21] Appl. No.: 308,321

[22] Filed: Sep. 19, 1994

[51] Int. Cl.[6] ............................................ H04N 1/40
[52] U.S. Cl. ...................... 358/457; 358/465; 382/168; 382/169; 382/237
[58] Field of Search ........................... 358/455, 456, 358/457, 458, 465, 466, 448, 534, 535, 536; 382/168, 169, 172, 237

[56] References Cited

U.S. PATENT DOCUMENTS 4,742,400  5/1988  Tsuji ............................................ 358/458
4,792,979  12/1988  Nomura et al. ........................... 382/169
4,910,603  3/1990  Hirahara et al. .......................... 358/457
5,053,888  10/1991  Nomura ..................................... 358/456
5,410,617  4/1995  Kidd et al. ................................ 358/466
5,469,515  11/1995  Lin ............................................ 358/457

*Primary Examiner*—Thomas D. Lee
*Attorney, Agent, or Firm*—Pehr Jansson

[57] ABSTRACT

A method and a system for generating a dither matrix calibrated to a desired tonal response. The method and system comprise generating a dither matrix with a predicted tonal response, measuring the actual tonal response, manipulating a cumulative histogram for the dither matrix in response to the actual tonal response, and inputting the cumulative histogram to a dither matrix generation program to generate a dither matrix that conforms to the cumulative histogram. Other systems and methods are disclosed.

16 Claims, 17 Drawing Sheets

SYSTEM AND METHOD FOR GENERATING CALIBRATED DITHER MATRICES

CROSS REFERENCE TO RELATED APPLICATIONS

The present patent application is related to patent application Ser. No. 08/057,244 entitled "Halftone Images Using Printed Symbols Modelling," by Qian Lin, filed on May 3, 1993, and to U.S. Pat. No. 5,317,418 entitled "Halftone Images Using Special Filters," by Qian Lin, filed on May 11, 1993, both of which are incorporated herein by reference.

BACKGROUND OF THE INVENTION

The present invention relates generally to halftone images and more particularly to systems and methods for generating calibrated dither matrices for use in creating halftone images.

An image rendering device, such as a printer or a monitor, can be designed to render a picture as a halftone or a continuous tone image. For a halftone image, each pixel of the image either has a symbol rendered or not rendered. For a continuous tone image, each symbol on a pixel is further refined to have one of many tone levels.

A halftone image is usually easier and cheaper to generate than a continuous tone image. Many relatively low cost printers are specifically designed to print halftone images. To use such a printer to print a continuous tone image, the image must be transformed to a halftone image. One objective of the printing industry is to develop appropriate transformation techniques so that the halftone image becomes visually indistinguishable from the continuous tone image. Similar objectives exist for other output devices.

A common way of transforming a continuous tone image to a halftone image is by means of a dither matrix. The continuous tone image has many pixels, each pixel having a value. The dither matrix occupies physical space and has numerous elements, each element also having a value. This matrix is mapped over the continuous tone image. For an image that is larger than the space occupied by the dither matrix, the matrix replicates itself to cover the entire image. Each element in the matrix is compared to its corresponding continuous tone image pixel. If the continuous tone image pixel has a larger value, a pixel will not be rendered in a corresponding position of the halftone image.

The elements of the dither matrix are termed threshold values. The distribution of threshold values in a dither matrix determines the tonal response of the dither matrix. A goal of halftone printer design is accurate and pleasing reproduction of continuous tone images. To achieve these goals, the dither matrix must be calibrated, i.e., the threshold values which makes up the dither matrix must be adjusted. One goal of calibration is to ensure that when continuous tone images of particular darkness is printed on a halftone printer they have the same darkness as the original images, respectively. Analogous goals exist for other output devices, such as monitors.

In one prior approach (described in J. Shiau and L. C. Willams, Semiautomatic printer calibration with scanners, *Journal of Imaging Science and Technology*, 36(3):211–219, 1992), the dither matrix was calibrated after the halftone patterns of the matrix are determined. That method works well if the number of tone levels of the matrix is small, because the halftone patterns are preserved. When the number of tone levels of a matrix is large, for example, 256, that procedure causes some different halftone patterns to be mapped to the same tone level, thereby reducing the available number of tone levels after calibration.

In another prior approach, described in the co-pending patent application entitled "Halftone Images Using Printed Symbols Modelling", the calibration is performed by modeling the printer dots and predicting the tonal response during the dither matrix generation process. This method does not work well for all output devices and does not provide for further adjustment of the generated dither matrix.

It is therefore desirable to provide a system and a method for generating calibrated dither matrixes during the dither matrix generation process.

It is further desirable to have a method and a system for generating calibrated dither matrixes without reducing the number of available tone levels.

It is also desirable to have a dither matrix calibration system and method that permits an output device to map the number of distinguishable tone levels in the dynamic range of the source into the same number of levels in its own dynamic range.

Furthermore, it is desirable to provide a method and a system for enabling fine tuning of the dither matrix to a specific halftone imaging device.

SUMMARY OF THE INVENTION

The present invention provides a method and a system for generating a dither matrix calibrated to a desired tonal response. It comprises generating a dither matrix with a predicted tonal response, measuring the actual tonal response, manipulating a cumulative histogram for the dither matrix in response to the actual tonal response, and inputting the cumulative histogram to a dither matrix generation program to generate a dither matrix that conforms to the cumulative histogram.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
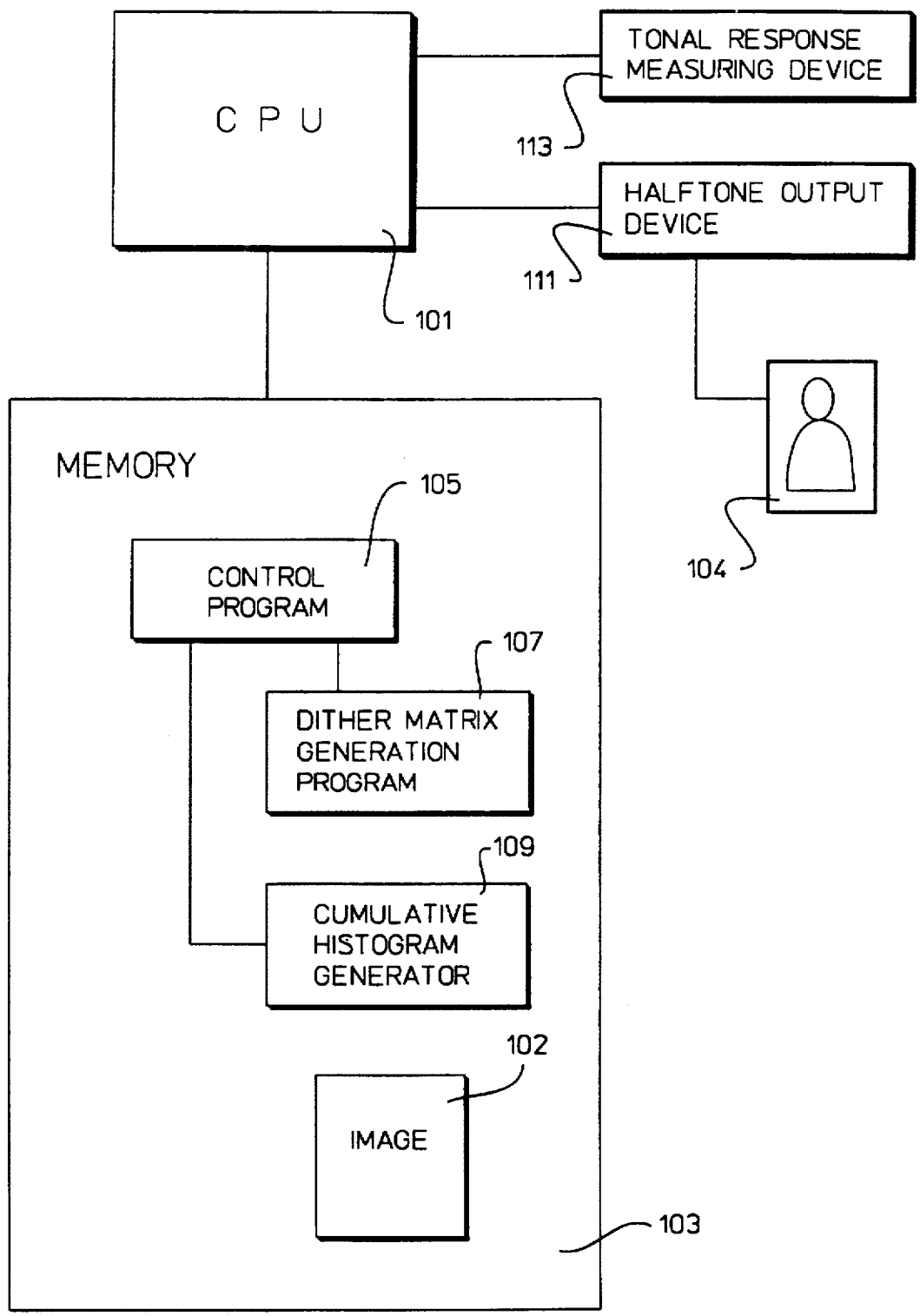
FIG. 1 is a block diagram of a computer system for generating calibrated dither matrixes according to the present invention.

FIG. 1 is a block diagram of a computer system 100 for generating calibrated dither matrixes according to the present invention. A Central Processing Unit (CPU) 101 is connected to a computer memory 103. The computer memory 103 contains a control program 105, a dither matrix generation program 107, and a cumulative histogram generator 109. The CPU 101 may also be attached to a plurality of secondary storage devices (not shown). The programs 105, 107 and 109 may be stored on these secondary storage devices and loaded into the computer memory prior to the execution of these programs.

The control program 105 is logically connected to the dither matrix generation program 107 and cumulative histogram generator 109.

The CPU 101 is further connected to a halftone output device 111. The halftone output device 111 is operable to output continuous tone images using a dither matrix generated by the dither matrix generator 107. The halftone output device 111 may be either a black-and-white or a color halftone output device.

Figure 2:
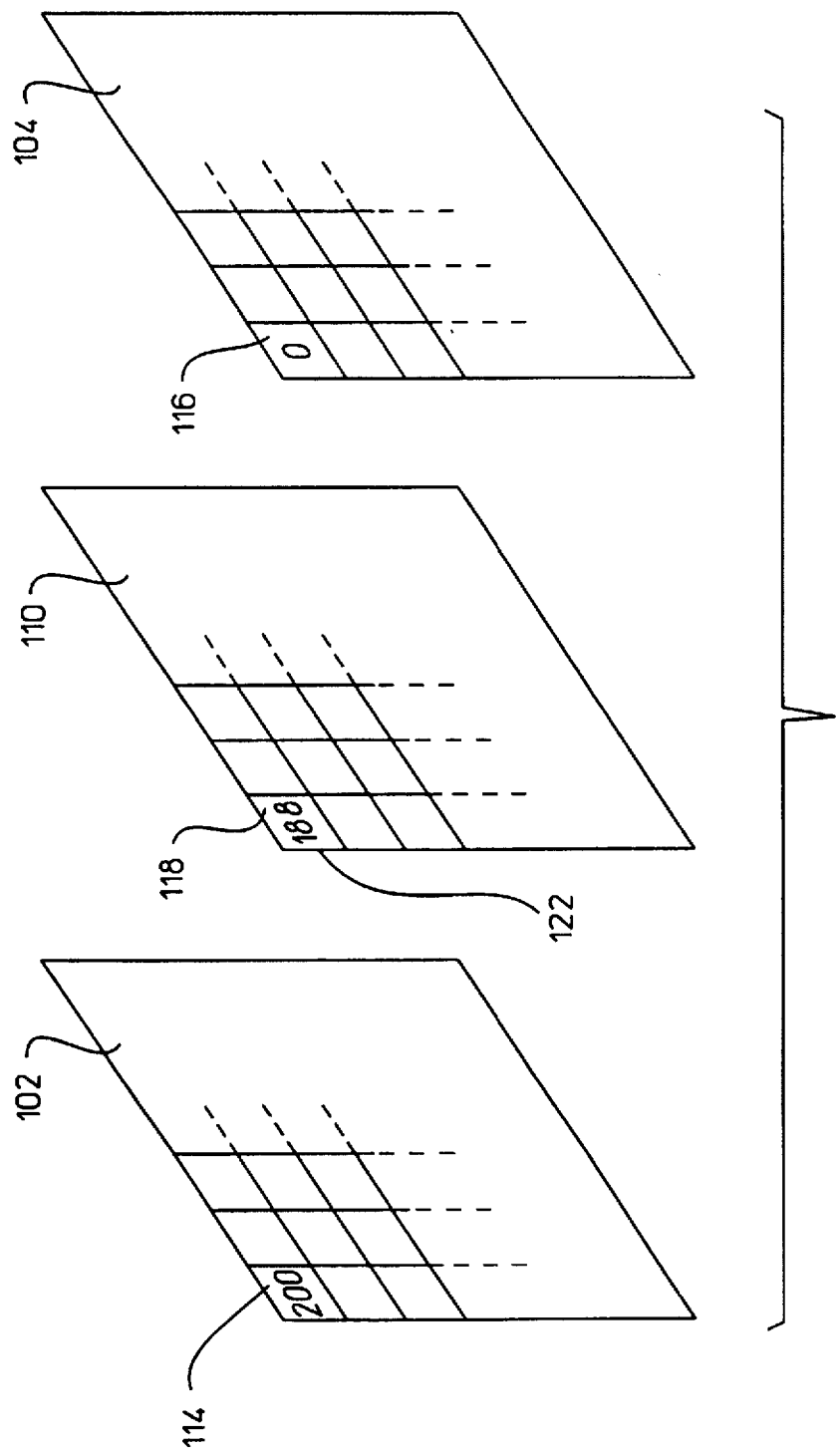
FIG. 2 shows a preferred dither matrix used by the computer system of FIG. 1.

In operation, the computer system 100 converts a grey scale image 102, stored, for example, in the computer memory 103, into a halftone image 104. The halftone image is represented by symbols output on the halftone output device 111. FIG. 2 shows a preferred dither matrix 110 used by the computer system 100 to generate the halftone image 104. The halftone image 104, the continuous tone image 102, and the dither matrix 110, each occupies an area; for example, the dither matrix occupies an area 112. The three areas are substantially equal each other. The size of the dither matrix is small, and depends on the resolution of the output device. A dither matrix is a dimensionless array of integers. The size of the dither matrix is defined in terms of the number of rows and columns it contains. So long as the number of rows and columns of the dither matrix is smaller than the number of rows and columns in the image, the matrix will be replicated.

Both the halftone image 104 and the continuous tone image 102 have many pixels such as the continuous tone image pixel 114 and the halftone image pixel 116. Each pixel has a value; for example, the continuous tone image pixel 114 has a value of 200 and the halftone image pixel 116 has a value of 0. The dither matrix 110 has many elements; for example the element 118. In one preferred embodiment, the matrix has 128 rows by 128 columns of elements. Each element has a value and occupies a position in the dither matrix area; for example, the element 118 has a value 188, and occupies a position 122.

Both the continuous tone and the halftone image may be in black-and-white or color. One preferred way to represent color is to have three components or symbols for each pixel, each component or symbol having a different color.

The method of generating the halftone image includes the steps of comparing the value of each pixel of the continuous tone image with the value of an element in the dither matrix. Based on the result of the comparison, the value of a corresponding pixel of the halftone image is determined. For example, the value 200 of the continuous tone image pixel 114 is compared to the value 188 of the element 118. Based on the comparison, the value of the pixel 116 is determined to be a minimum value, such as 0, which means that a symbol will not be output at that pixel.

Figure 3:
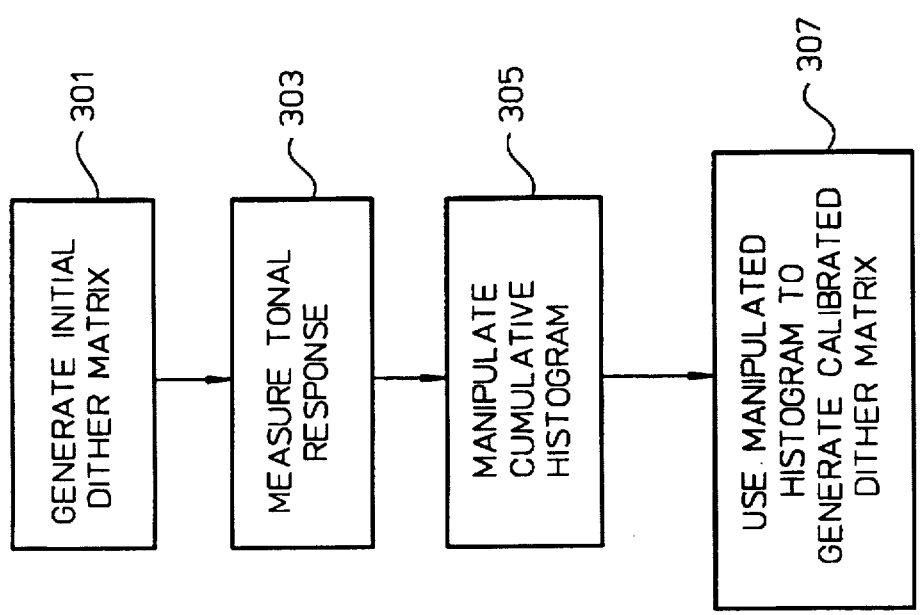
FIG. 3 is a flow chart showing the steps of generating a calibrated dither matrix in accordance to the method of a preferred embodiment of the present invention.

FIG. 3 is a flow chart showing the steps of generating a calibrated dither matrix in accordance to the method of a preferred embodiment of the present invention. The first step is to generate an initial dither matrix having a tonal response close to the desired tonal response, for example the dither matrix 110, step 301. An alternative view of the first step is that the dither matrix is given a set of initial threshold values. The initial dither matrix may be generated using printed symbols modelling technique described in the co-pending patent application entitled "Halftone Image Using Printed Symbols Modelling", which is incorporated herein by reference.

The second step of the method of creating a calibrated dither matrix is to measure the tonal response output using the dither matrix. Returning to FIG. 1, CPU 101 is further connected to a tonal response measuring device 113. The tonal response measuring device 113 is, for example, one of the following: a densitometer measuring total reflectance energy, a scanner having a digital output, a calorimeter or spectrophotometer outputting luminance, or a spectrometer or calorimeter measuring CIE color specification. In the case of the latter, the tonal response is color differences obtained from the CIE color specification. Thus, the nature of the property "tonal response" depends on the equipment used to measure it.

Figure 6:
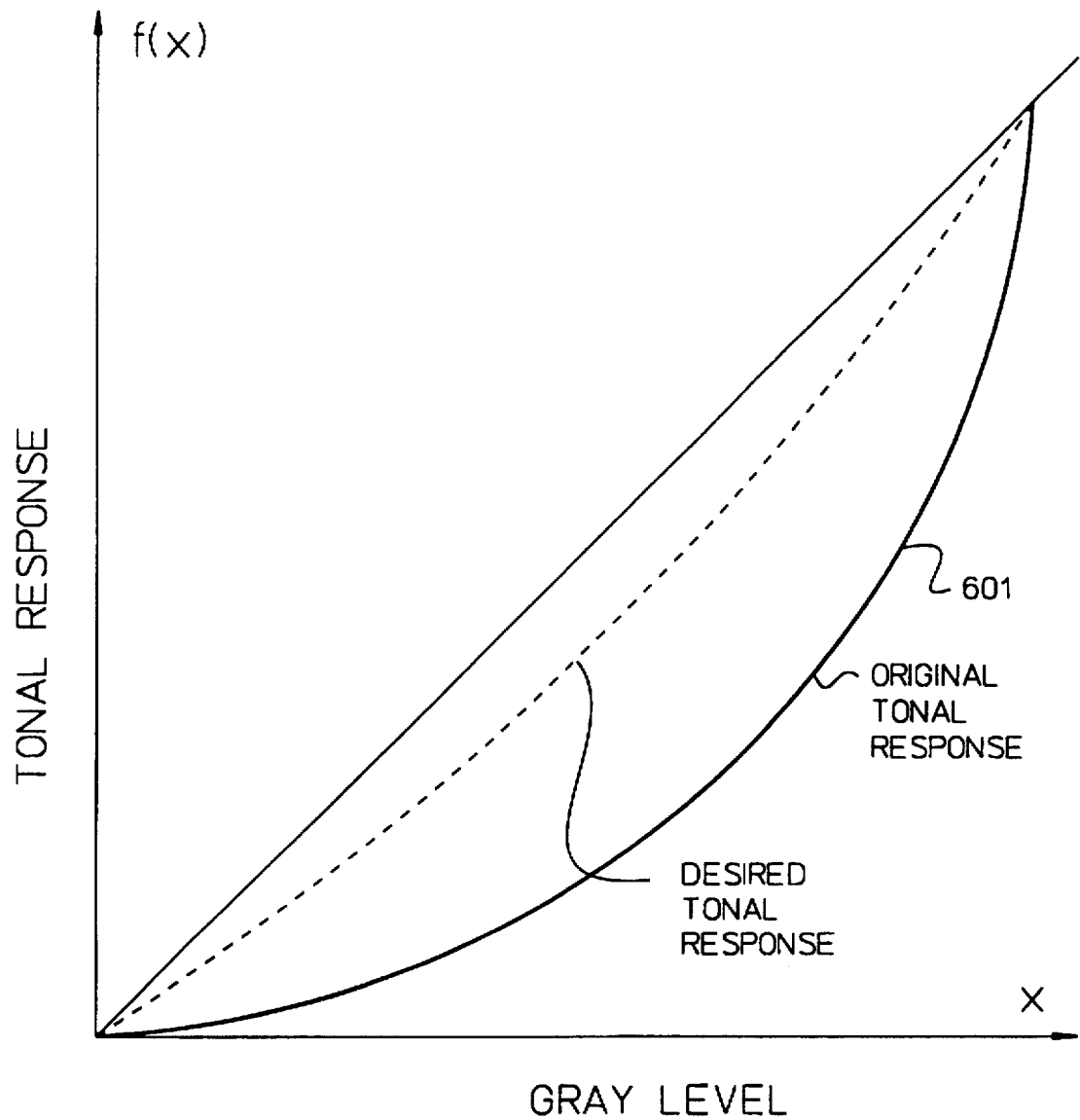
FIG. 6 is a graphical representation of an example of measured tonal response and desired tonal response.

To measure the tonal response, output patterns corresponding to various tone levels are output on the halftone output device 104. These halftone outputs are then read by the tonal response measuring device 113. The measurements from the tonal response measuring device is a function of tone level. An example of tonal response corresponding to a particular dither matrix is shown as curve 601 of FIG. 6.

Figure 4:
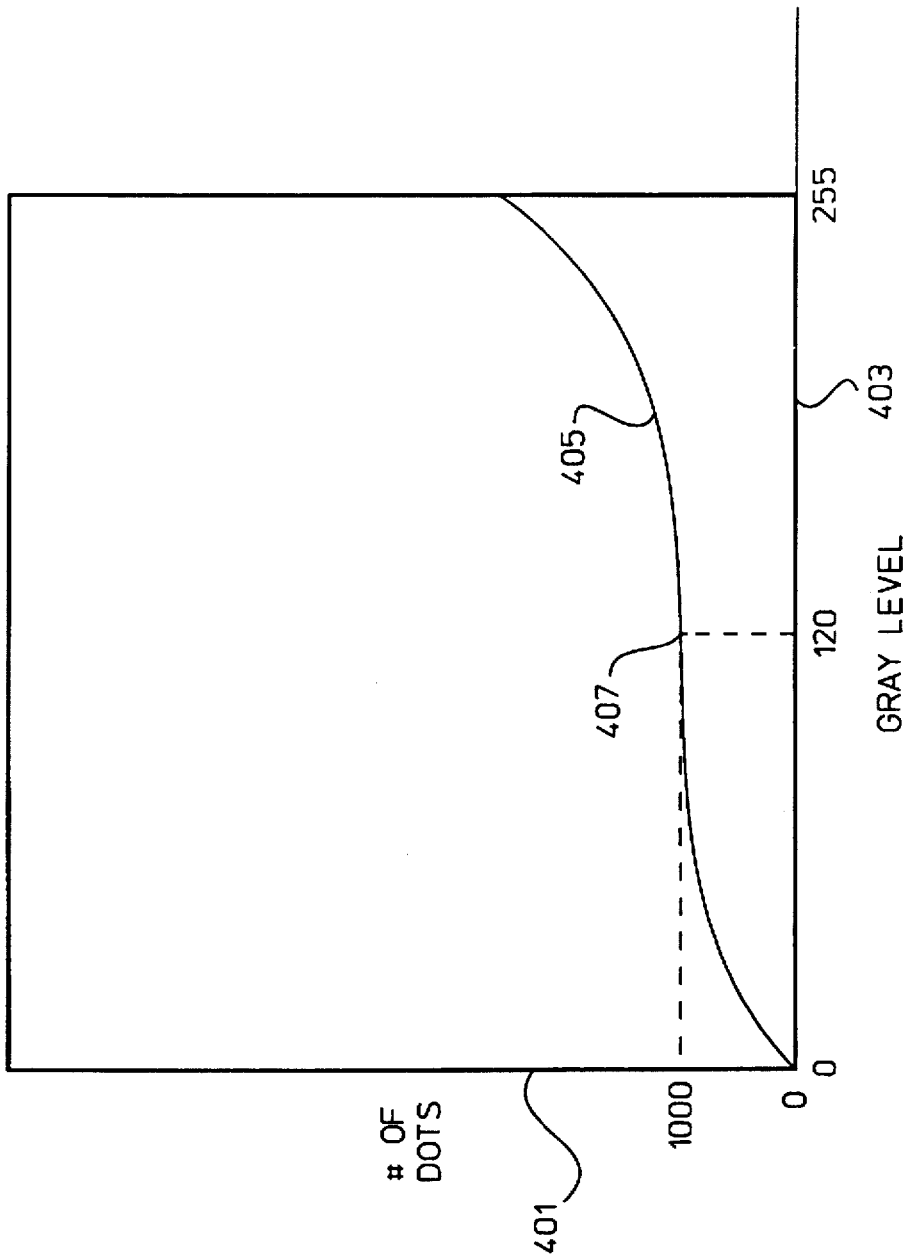
FIG. 4 is graphical representation of a cumulative histogram for a dither matrix.

The third step in generating a calibrated dither matrix is to manipulate the cumulative histogram that describes the matrix in response to the measured tonal response, step 305. FIG. 4 is graphical representation of a cumulative histogram for a dither matrix. The cumulative histogram is a function of tone level. For a given tone level the cumulative histogram indicates the number of dots that are output in the halftone rendition of an image at that tone level. In FIG. 4, the vertical axis 401 indicates the number of dots and the horizontal axis 403 indicates the tone level. The curve 405 indicates the cumulative histogram of a dither matrix. For example, given a 128 by 128 dither matrix, such as dither matrix 110 of FIG. 2, there are, for example, 256 tone levels, 0 through 255. As an example, a point 407 on the curve 405 corresponds to a tone level 120 that has 1000 pixels turned on for a pattern corresponding to that tone level. In the corresponding dither matrix there are 1000 elements with values of less than or equal to 120.

Returning to FIG. 3, the final step of the generation of a calibrated dither matrix is to input the cumulative histogram to the dither matrix generation program 107.

Prior to the first step, a target tonal response is determined. The target tonal response is application specific. For example, for the purpose of calibrating the tonal response of a new dither matrix to that of an existing dither matrix, the target tonal response is the tonal response of the existing dither matrix. Another example is that of linearizing the luminance of a dither matrix, in which case the target tonal response is the linear luminance.

To generate an initial dither matrix or to initialize the dither matrix, step 301, a dither matrix with a tonal response that approximates the target tonal response is generated. One way to achieve that is to follow the method described in the co-pending patent application entitled "Halftone images using printed symbol modelling," which is incorporated herein by reference. For each halftone pattern, i.e., for each pattern used to generate a halftone pattern corresponding to each tone level, the area of dot coverage can be predicted using a printer dot model. From the area of dot coverage the tone reflectance can be calculated using the Yule-Nielsen equation. J. A. C. Yule and W. J. Nielsen, the penetration of light into paper and its effect on halftone reproduction. *TAGA Proc.*, 3:65–76, 1951. Knowing the tone reflectance of each halftone pattern, a dither matrix with tonal response approximating the target tonal response can be generated.

Figure 5:
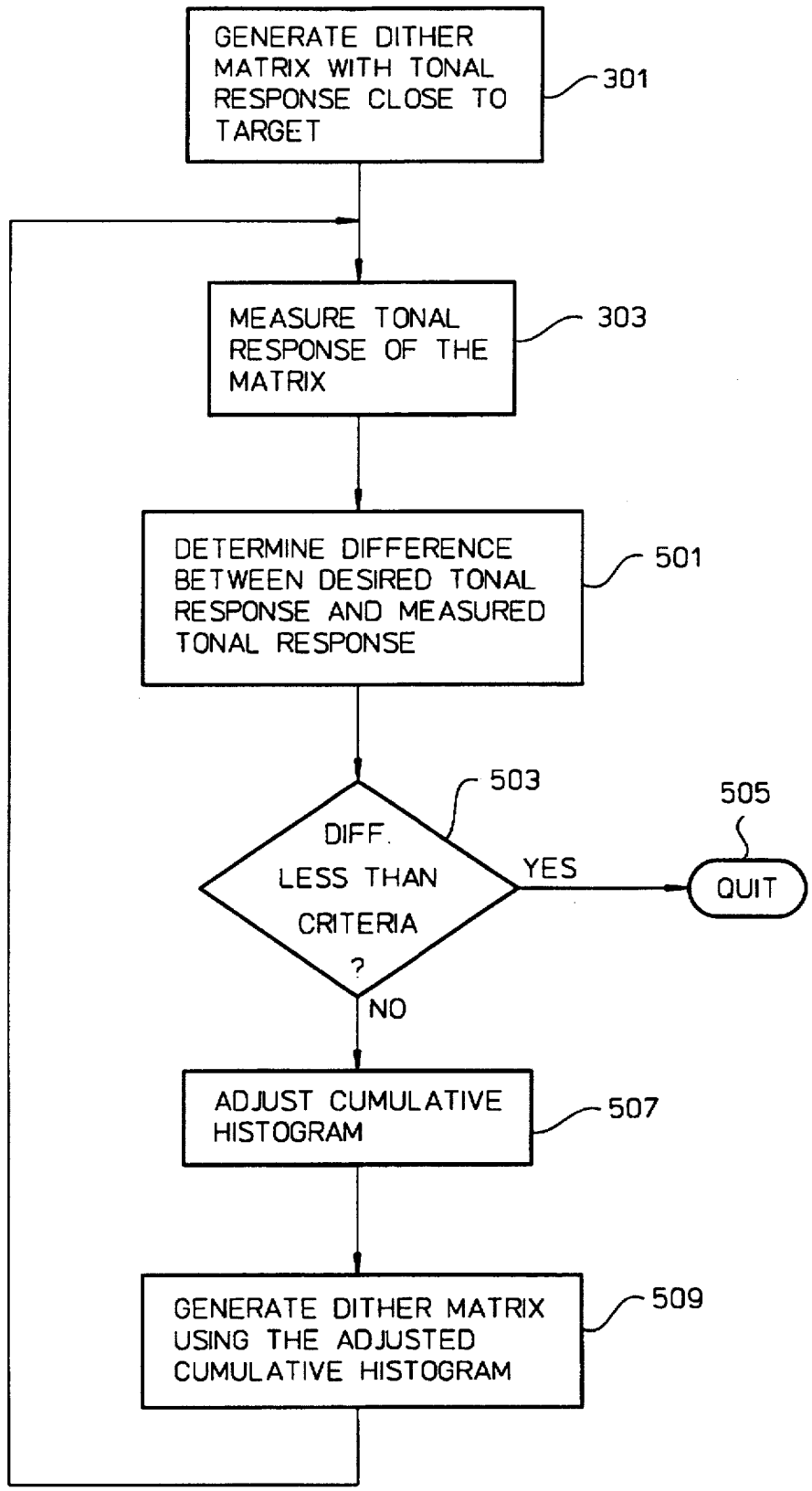
FIG. 5 is a flow chart showing the steps of a first embodiment of the present invention incorporating the manipulation of the cumulative histogram and generating a dither matrix that conforms to the modified cumulative histogram thereby generating a calibrated dither matrix.

FIG. 5 is a flow chart showing the steps of a first embodiment of the present invention incorporating the manipulation of the cumulative histogram and generating a dither matrix that conforms to the modified cumulative histogram thereby generating a calibrated dither matrix. The method of FIG. 5 is an iterative refinement of the cumulative histogram and associated dither matrix. The method calls for iterative adjustment to cumulative histogram until the generated dither matrix produces a tonal response that is within some defined acceptance criterion, e.g., a close match to the desired tonal response.

The first two steps shown in FIG. 5 are the same as steps 301 and 303 of FIG. 3. Following the generation of an initial dither matrix and the measurement of its corresponding tonal response, the difference between that measured tonal response and the desired tonal response is determined, step 501.

If the difference between the measured tonal response and the desired tonal response is sufficiently small, i.e., meets a predefined acceptance criterion, step 503, the procedure terminates, step 505.

Figure 7:
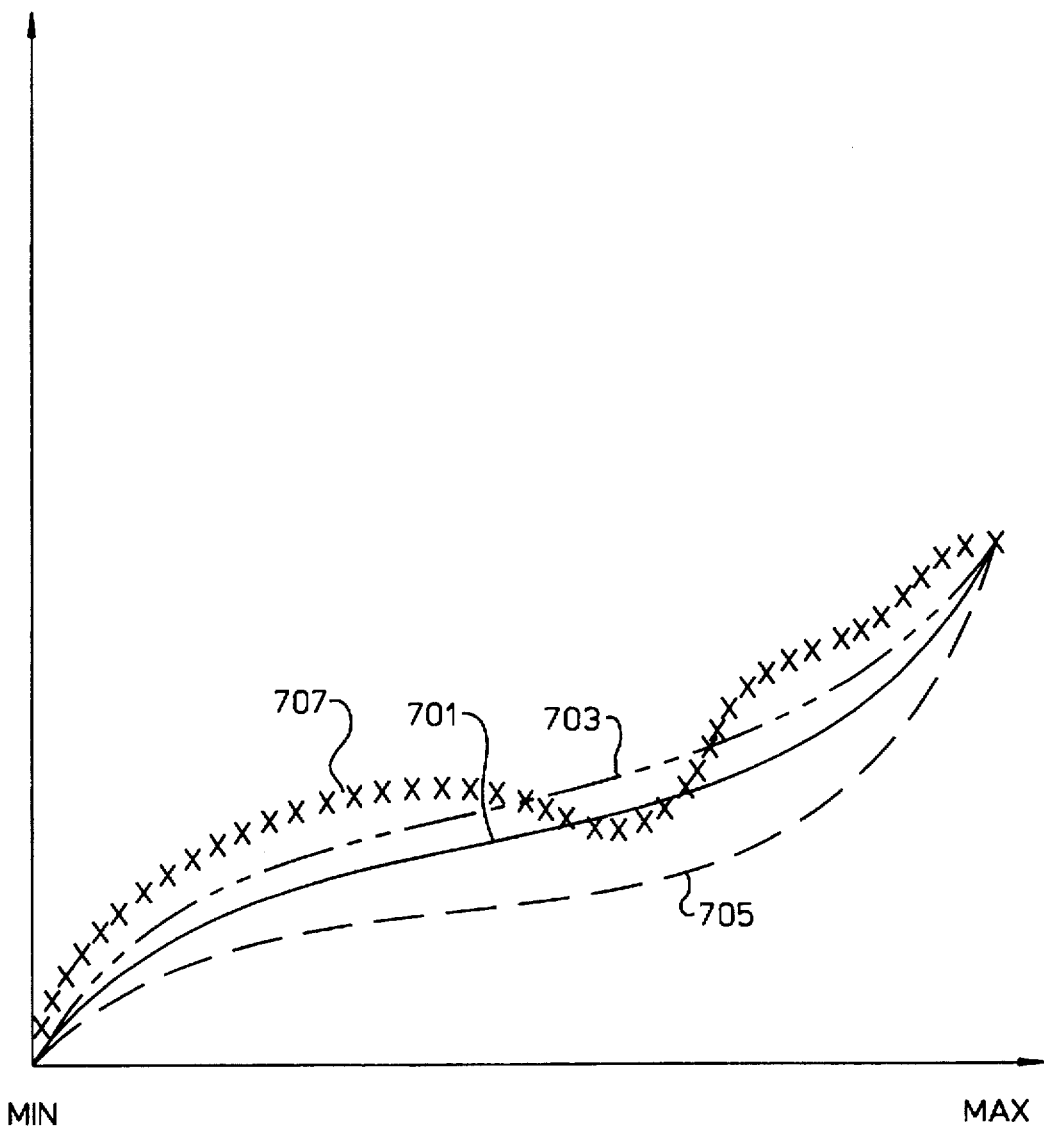
FIG. 7 shows the modification of a cumulative histogram.

If the difference between the measured tonal response does not meet the acceptance criterion, the cumulative histogram is modified, step 507. FIG. 7 shows the modification of the cumulative histogram. A curve 701 shows the cumulative histogram of the dither matrix. If the comparison of the tonal response from the dither matrix to the desired tonal response indicates that the halftone output is too light, the cumulative histogram is moved upwards, i.e., the number of pixels turned on at a given tone level is increased. This move is indicated by the curve 703. On the other hand, if the tonal response is too dark, the cumulative histogram is lowered, i.e., the number of pixels turned on reduced for each tone level. This type of adjustment is shown in as curve 705.

Because the tonal response is a function of tone level, it is possible that the tonal response for certain tone levels is too low and for other tone levels, is too high. In such situations, the cumulative histogram may be lowered for some tone levels and increased for others. Curve 707 is an illustration of such an adjustment.

Next, a new dither matrix is generated which conforms to the adjusted cumulative histogram, step 509, following which step the procedure returns to the measurement step, step 303. Generation of a dither matrix which conforms to a given cumulative histogram is described below in conjunction with FIGS. 10–14.

Figure 8:
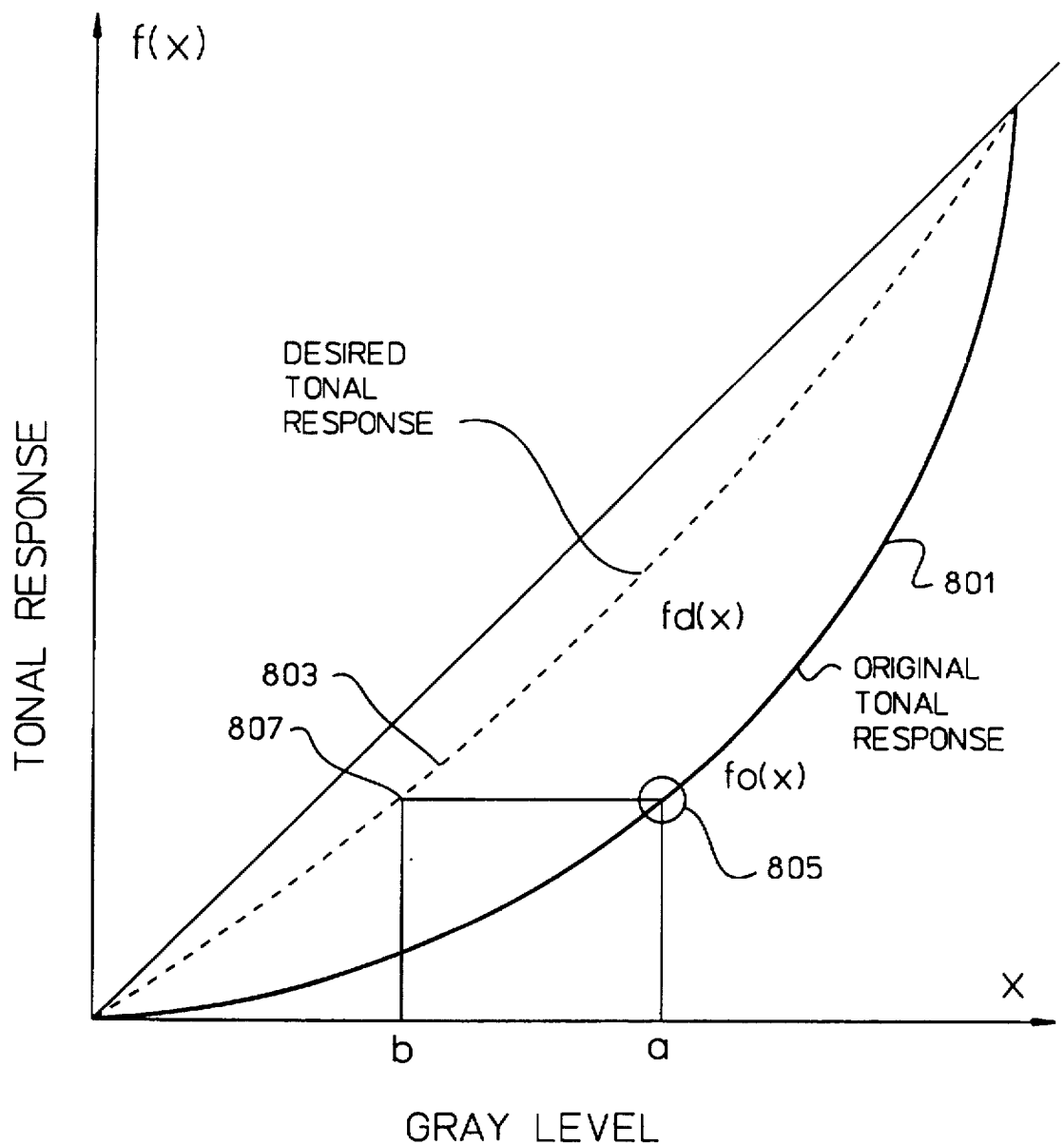
FIG. 8 is a graphical illustration of the direct mapping of threshold values according to one embodiment of the present invention.

In an alternative embodiment, the threshold values of the elements composing a dither matrix are adjusted using a direct mapping method in which the threshold values are set to the tone level at the point at which the desired tonal response function has the same value as the measured tonal response function does at the original tone level. FIG. 8 illustrates this concept.

Figure 9:
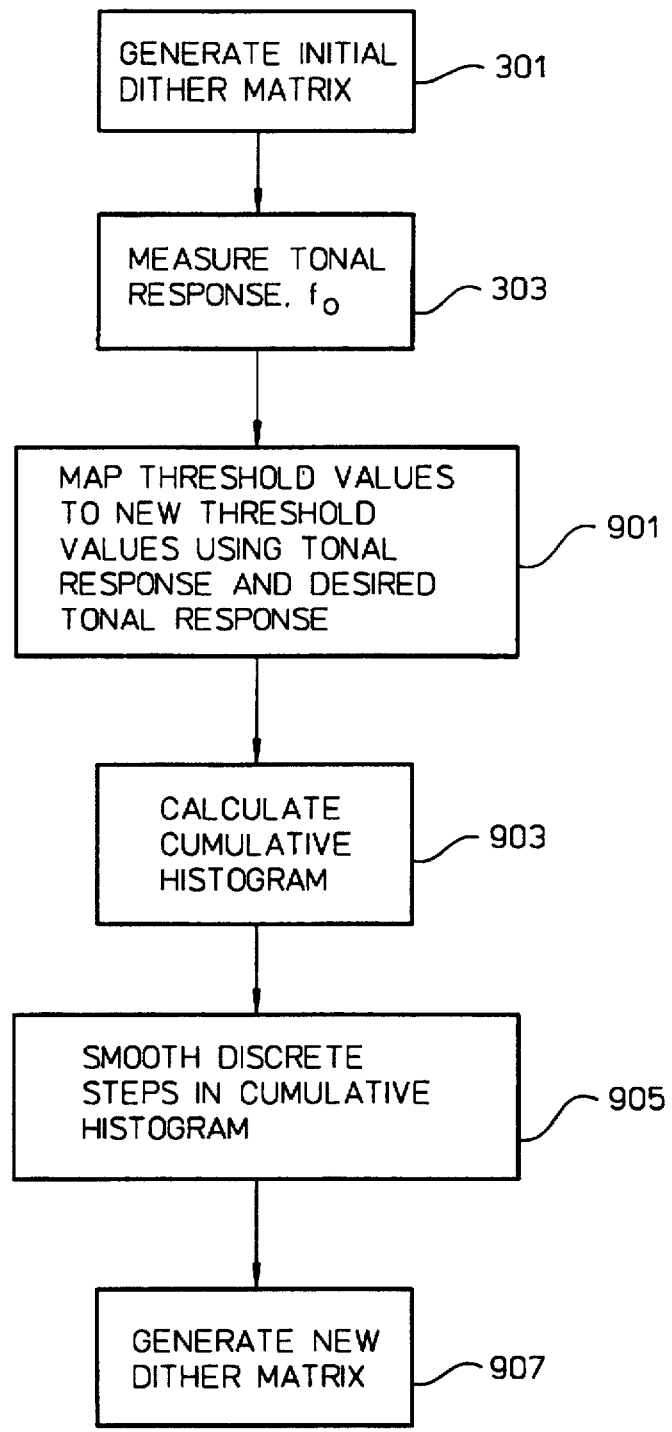
FIG. 9 is a flow chart showing the steps for the direct mapping method of generating a calibrated dither matrix.

FIG. 9 is a flow chart showing the steps for the direct mapping method of generating a calibrated dither matrix. The first two steps are the same as steps 301 and 303 discussed above in conjunction with FIG. 3. In step 303 the tonal response function, $f_o$, is measured. Next the threshold values of the dither matrix are mapped to new values based on the measured tonal response and the desired tonal response, step 901.

An initial dither matrix has an original tonal response function $f_o(x)$, shown as curve 801. The desired tonal response function $f_d(x)$ is shown as curve 803. The dither matrix is composed of elements $t_{ij}$ and each $t_{ij}$ may take on a value within a range of tone levels.

The elements $t_{ij}$ are changed using a method described in the pseudo-code of Table 1.

For each tone level a:

For each $t_{ij}$ with a value equal to a:

$$t_{ij} := f_x(a).$$

Table 1.

I.e., each $t_{ij}$ is set to a value which is a function of its value.

In a preferred embodiment $f_x$ is $f_d^{-1}(f_o(x))$. This is the particular case illustrated in FIG. 8. Given a point 805 on the curve 801, it corresponds to the tone level a. For each threshold value the tonal response is determined. Thus, in FIG. 8, for value a, the tonal response is the value of $f_o(a)$, point 805. Next, the point on the desired tonal response function $f_d(x)$ where $f_d(x)=f_o(a)$ is determined. This point is point 807. The ordinate of that point is determined, which in the example is the value b. Finally, each $t_{ij}$ with the value a is set to the value b.

In a special case, if the desired tonal response function is linear, $f_x(a)$ is $f_o(a)$. In that case, for each threshold value a, dither matrix elements $t_{ij}$, that have the value a, are set to $f_o(a)$.

Following the mapping step, step 901, a new threshold matrix has been obtained. However, a number of tone levels may have been lost due to quantization errors. To correct for any lost tone levels, a cumulative histogram is calculated for the matrix obtained in step 901, step 903.

This cumulative histogram is then smoothed, step 905. During the smoothing step, step 905, any discrete steps are smoothed out, thus generating a strictly monotonic cumulative histogram.

Finally, the cumulative histogram from step 905 is input to the dither matrix generation program 107 to generate a dither matrix based on the cumulative histogram, step 907.

Figure 10:
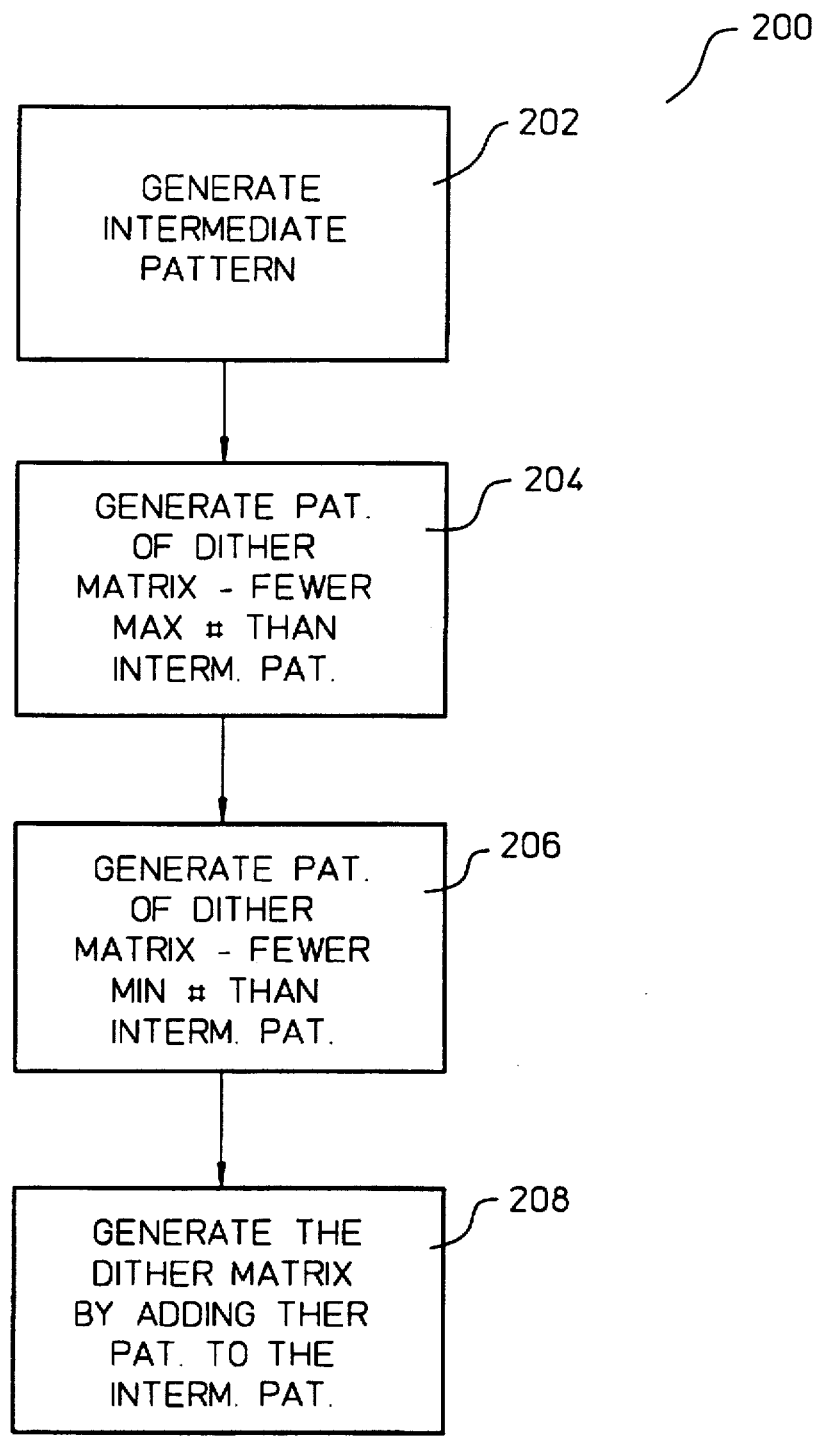
FIG. 10 shows the preferred steps to generate a dither matrix of the present invention.
Figure 11:
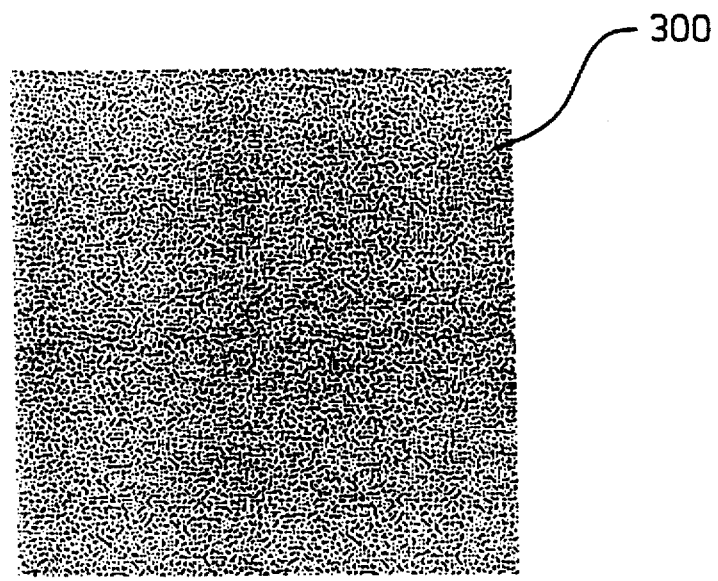
FIG. 11 shows an example of an intermediate pattern of the present invention.

FIG. 10 shows the steps 200 to generate the dither matrix 110. The first step, 202, is to generate an intermediate pattern with elements having values of either one or zero. The elements with ones are substantially uniformly distributed within the pattern. The values of the elements are dependent on the model of the symbols. FIG. 11 shows an example of an intermediate pattern 300, with 128 rows by 128 columns of elements. The pattern shown in FIG. 11 was printed by a 600 dpi printer and enhanced by magnifying it nine times, with the image duplicated 4 times, once along the horizontal direction, and then along the vertical direction. A symbol output implies that the element at that position has a value of one, and a void implies that the element at that position has a value of zero.

In the second step, 204, patterns of the dither matrix 110 with fewer elements having ones than the intermediate pattern 300 are generated. This is done through modifying the values of the elements by the model of the symbols and through replacing a plurality of ones with zeros from the intermediate pattern 300. The ones to be replaced are in regions with elements having ones clustered together as identified by a filter. The difference in the number of elements having ones from one pattern to its next pattern is dependent on a quantization number.

In the third step, 206, patterns of the dither matrix 110 with fewer zeros than the intermediate pattern 300 are generated. This is done through modifying the values of the elements by the model of the symbols and through replacing a plurality of zeros with ones from the intermediate pattern 300. The zeros to be replaced are in regions with elements having zeros clustered together as identified by the filter. The difference in the number of elements having zeros from one pattern to its next pattern is dependent on the quantization number.

Finally, in step four, 208, the dither matrix, 110, is formed by adding all the patterns to the intermediate pattern.

Steps two to four are not restricted to that sequence. Step three, 206, can be done before step two 204. Step four, 208, the summing step, can be performed as the patterns are generated. For example, after the formation of the intermediate pattern, the pattern is copied to the dither matrix. Then, as each additional pattern is generated, it is added to the dither matrix by matrix addition. So, when all the patterns are generated, the dither matrix 110 is also formed.

In the present example, the dither matrix, 110, has 128 rows by 128 columns of elements, and the grey scale image, 102, has 256 levels of lightness, including the two end levels, the level with no symbols and the level entirely covered with symbols. The levels of lightness determine the number of patterns for the dither matrix, 110. In one preferred embodiment, the total number of patterns including the intermediate pattern is 256. The difference in the number of elements having values equal to one between a pattern and its next pattern is dependent on the quantization number. For the purpose of generating a dither matrix which conforms to a cumulative histogram, the quantization number depends on the histogram and is defined as the increment in value of the histogram between successive tone level values.

Figure 12:
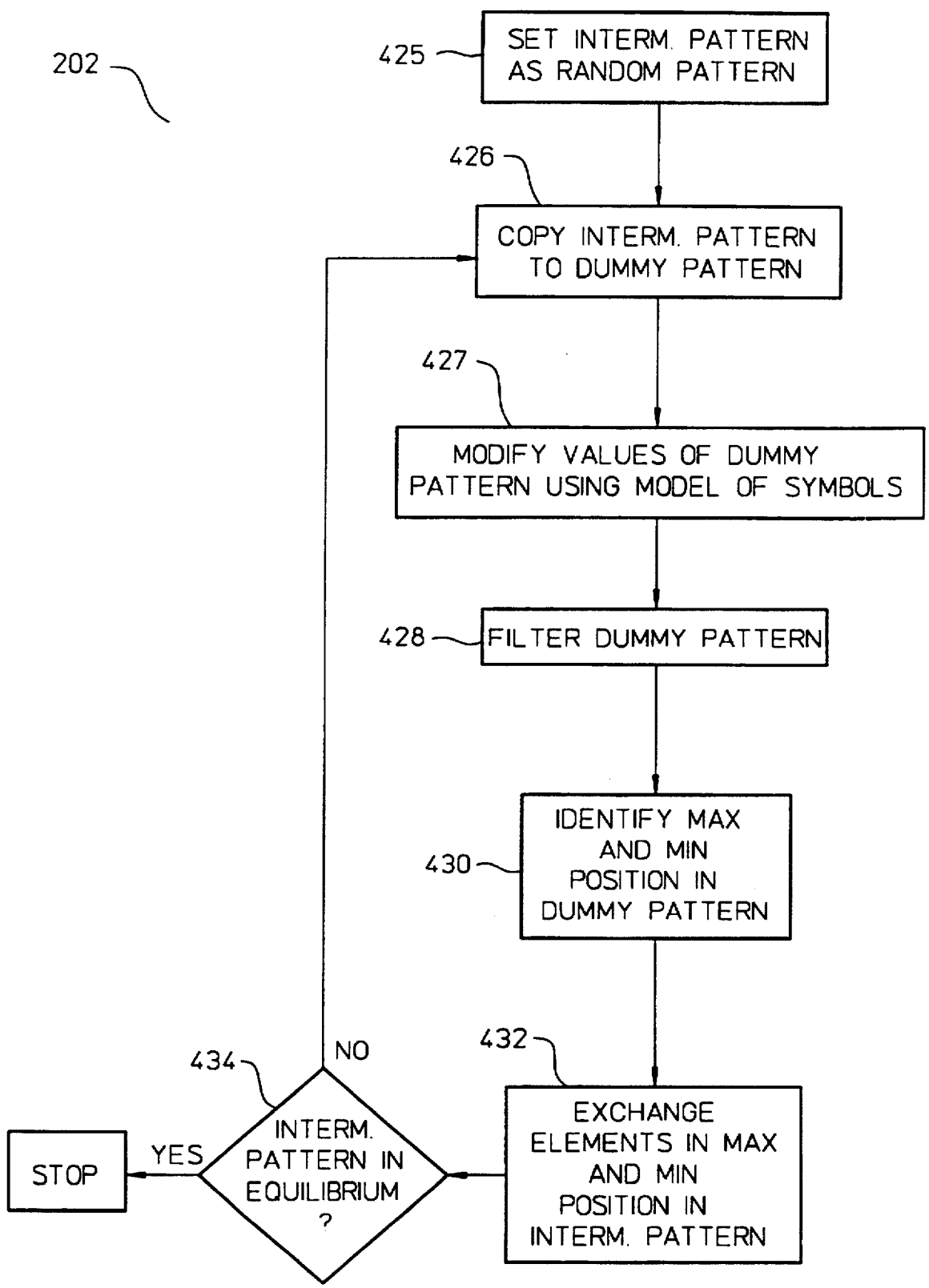
FIG. 12 describes the step of generating the intermediate pattern in greater detail.

FIG. 12 describes the step, 202, of generating the intermediate pattern 300, in more detail. The intermediate pattern is set, 425, to be a random pattern, with ones and zeros randomly distributed. Preferably, at least (100/255) percent of the elements in the random pattern have values equal to ones and at least (100/255) percent have values equal to zero. Then, the intermediate pattern 300 is copied to a dummy pattern, 426, and the values of the elements in the dummy pattern are modified, 427, by the model of the symbols. Another preferred method to modify the values of the elements is to find the probability of having toner particles as a function of position. Some printers, such as laser printers, uses toner particles to generate a symbol. In one embodiment, the optical beam to generate the toner particles is guassian in shape. So one preferred probability of having toner particles follows a guassian shape. Modification of the values of the elements of the dummy pattern using the model of the symbols and using the probability of having toner particles as function of position is described in greater detail in the copending patent application entitled "Halftone Images Using Printed Symbols Modelling".

Referring back to FIG. 12, after the values of the elements in the dummy pattern have been modified 427, the next step is to pass the dummy pattern through the filter. One preferred filter is described in U.S. Pat. No. 5,317,418, which is incorporated herein by reference. The dummy pattern is duplicated two dimensionally before it is filtered. This is known as circular convolution. For the modified dummy pattern, with sub-elements and bit maps, the filter has to sample more frequently, such as at every sub-element or at every bit. The filtering process will not be described in this application. A general discussion on this type of spatial filtering can be found in "Discrete Time Signal Processing," written by A. V. Opponheim and R. W. Schafer, Prentice Hall, 1989.

The filtered output would have the largest value at the location where the ones are most clustered together, and the smallest value at the location where there is the largest void. The position with the largest value is identified, 430, as the maximum position, and the position with the smallest value is identified as the minimum position, 356. If there are locations that are equally clustered or voided, then there will be more than one maximum or minimum position. In one preferred embodiment, the first position found to be the maximum and having a value of one in its corresponding position in the intermediate pattern is selected to be the maximum position. Similarly, the first position found to be the minimum and having the value of zero in its corresponding position in the intermediate pattern is selected to be the minimum position.

After the maximum and the minimum position are identified, 430, their elements in the intermediate pattern, 300, are exchanged, 432.

The intermediate pattern, 300, is then again copied to the dummy pattern to be modified by the model of the symbols and filtered. These steps are repeated numerous times, 434, until the intermediate pattern reaches an equilibrium state, such as the example shown in FIG. 11. At that point, the ones and the zeros are substantially uniformly distributed within the pattern.

Figure 13:
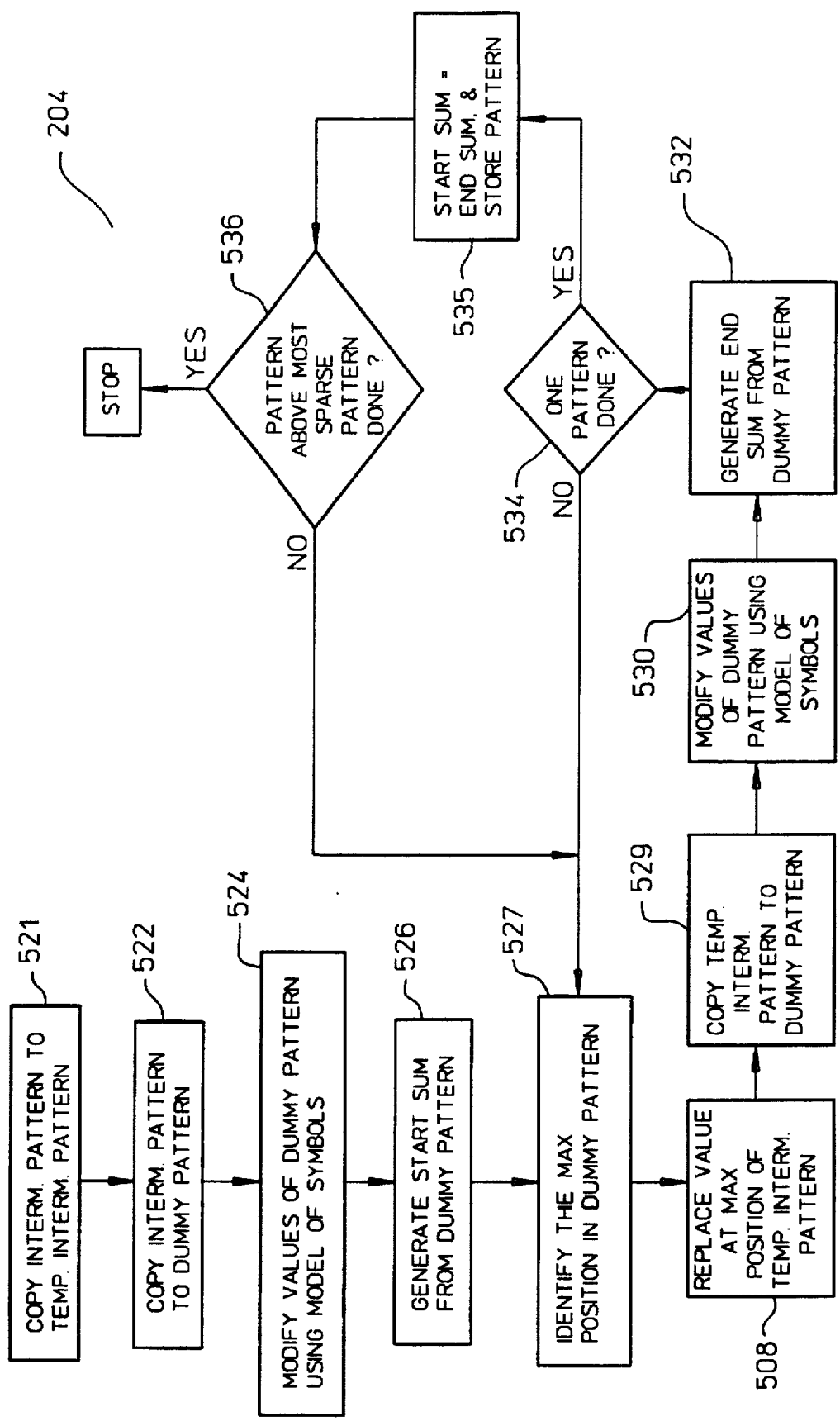
FIG. 13 describes the steps of generating patterns f the dither matrix of the present invention with fewer ones that the intermediate pattern.

The Dither matrix requires one or more patterns with elements having fewer ones. FIG. 13 describes the step, 204, of generating patterns of the dither matrix 110 with fewer ones than the intermediate pattern in more detail.

In generating the many patterns with fewer ones, first, the intermediate pattern, 300, is copied, 521, to a temporary-intermediate pattern, and is also copied, 522, into a dummy pattern. Then, the values of the elements in the dummy pattern are modified, 524, by the model of the symbols as described above, and a start sum is generated, 526.

In one embodiment, the start sum is equal to the sum of the values of the modified pattern. The way to calculate the tone reflectance from the coverage of the symbols on the pattern by the Yule-Nielsen equation is as described above. The dummy pattern is then filtered to identify, 527, the position of the dummy pattern where ones are substantially most clustered as the maximum position. The identification step is similar to the methods described above by the normalized guassian filter with a sigma of 1.5 and will not be further described here. The value of the element in the maximum position of the temporary-intermediate pattern is replaced, 528, with a zero.

Then, the values of the temporary-intermediate pattern are copied, 529, to the dummy pattern. The dummy pattern is again modified by the model of the symbol, 530, and an end sum is generated, 532. The end sum is generated the same way as the start sum.

The invented method then goes back, 534, to the "identify" step 527 until the difference between the start sum and end sum is less than or equal to the quantization number to generate one pattern of the dither matrix. The start sum then is set, 535, to be the end sum, and the generated pattern is stored in the computer 100. The quantization number is determined from the cumulative histogram.

The method then again goes back, 536, to the "identify" step 527, until the end sum is less than or equal to the quantization number to generate numerous patterns of the dither matrix 110 with fewer ones. The method will stop when the pattern above the most sparse pattern is generated because the most sparse pattern is the pattern with no symbols.

Figure 14:
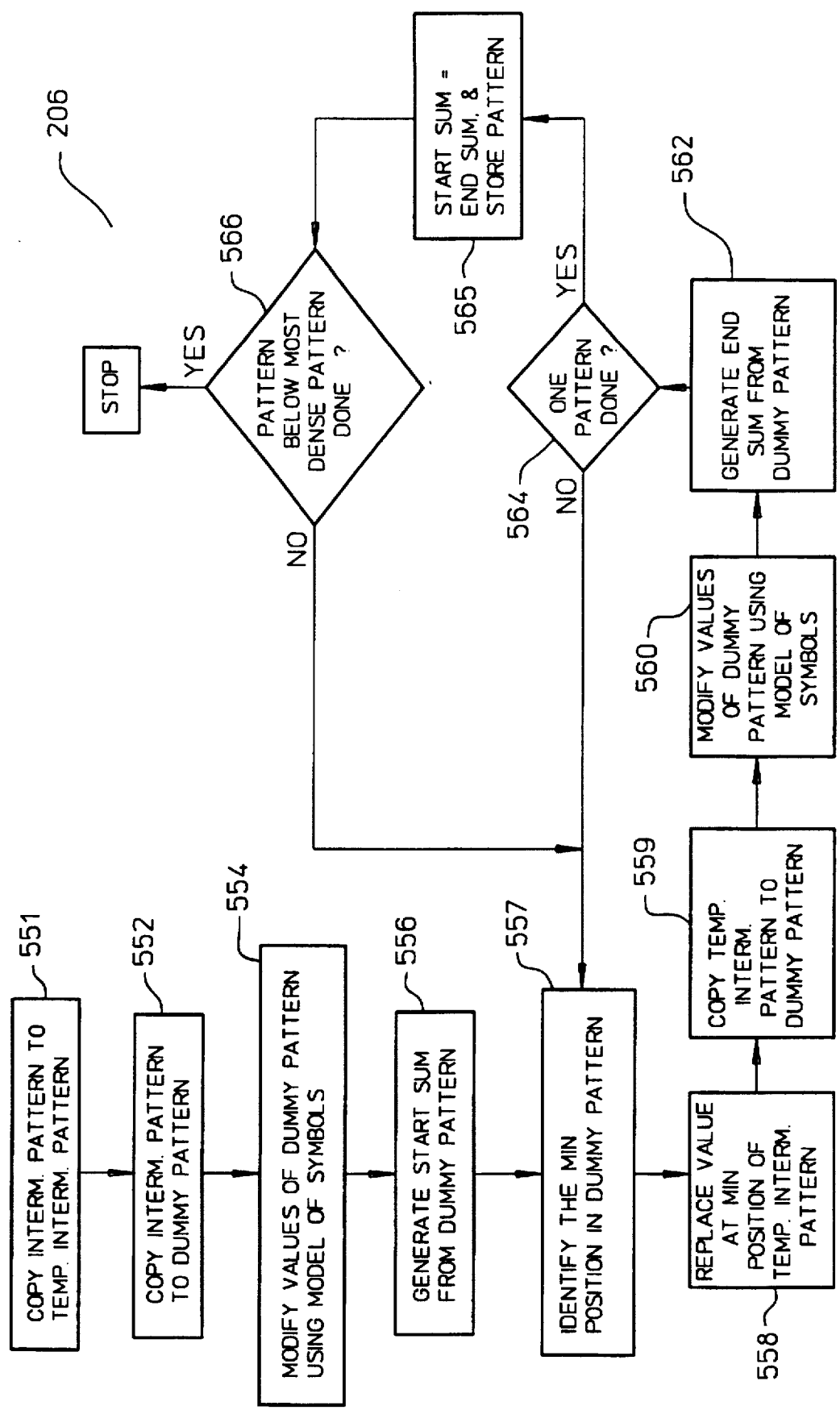
FIG. 14 describes the steps of generating patterns of the dither matrix of the present invention with fewer zeros that the intermediate pattern.

The dither matrix 110 also requires one or more patterns with fewer zeros. FIG. 14 describes the step, 206, of generating patterns of the dither matrix 110 with fewer zeros than the intermediate pattern in more detail. The steps shown in FIG. 14 are similar to the steps shown in FIG. 13. First, the intermediate pattern is copied, 551, into a temporary-intermediate pattern, and is also copied, 552, into a dummy pattern. Then, the values of the elements in the dummy pattern are modified, 554, by the model of the symbols. After the modification, a start sum is generated, 556. The element in the position of the dummy pattern where elements with zeros are substantially most clustered together is identified, 557, to be the minimum position. The element in the minimum position of the temporary-intermediate pattern is replaced, 558, with a one. After that, the temporary-intermediate pattern is copied, 559, to the dummy pattern, and the values of the elements in the dummy pattern are modified, 560, by the model of the symbol and an end sum is generated, 562. The above steps are repeated, 564, from the "identify" step, 557, until the difference between the start sum and end sum is less than or equal to the quantization number to generate one pattern of the dither matrix. At that point, the start sum is set, 565, to be the end sum, and the generated pattern is stored in the computer 100. Finally, the above steps are repeated from the "identify" step, 557, until the end sum is more than or equal to ((the total number of patterns of the dither matrix-1)*the quantization number) to generate numerous patterns for the dither matrix. Note that the total number of patterns is 256 in the present example. The method will stop when the pattern below the most dense pattern is generated because the most dense pattern is the pattern totally filled with symbols.

A common practice in calibrating black-and-white printers is to make the density of halftone patterns a linear function of the input digital value. Hence, the target tonal response is a linear function of density. The density of a halftone pattern can be measured with a densitometer.

In copier applications, wherein a printer is connected to a scanner to make copies of scanned documents, it is desirable for the copies to match the originals in tonal response. There is a multitude of possible source images, e.g., photographs, electronic images, printed text, etc. Therefore, the source image can have a different tonal dynamic range that the tonal range of the rendering device. In such applications, the tonal response measuring device 113 of FIG. 1 may be a scanner and the dither matrix calibration algorithm maps the dynamic range of the sources onto the dynamic range of the rendering device.

When halftone patterns for all input digital values within a given range, min:max (e.g., 0 to 255), the usual scanned values for halftone patterns typically are in a subrange s1:s2, such that $min < s_1 \leq$ scanned value $\leq s_2 < max$.

Figure 15A:
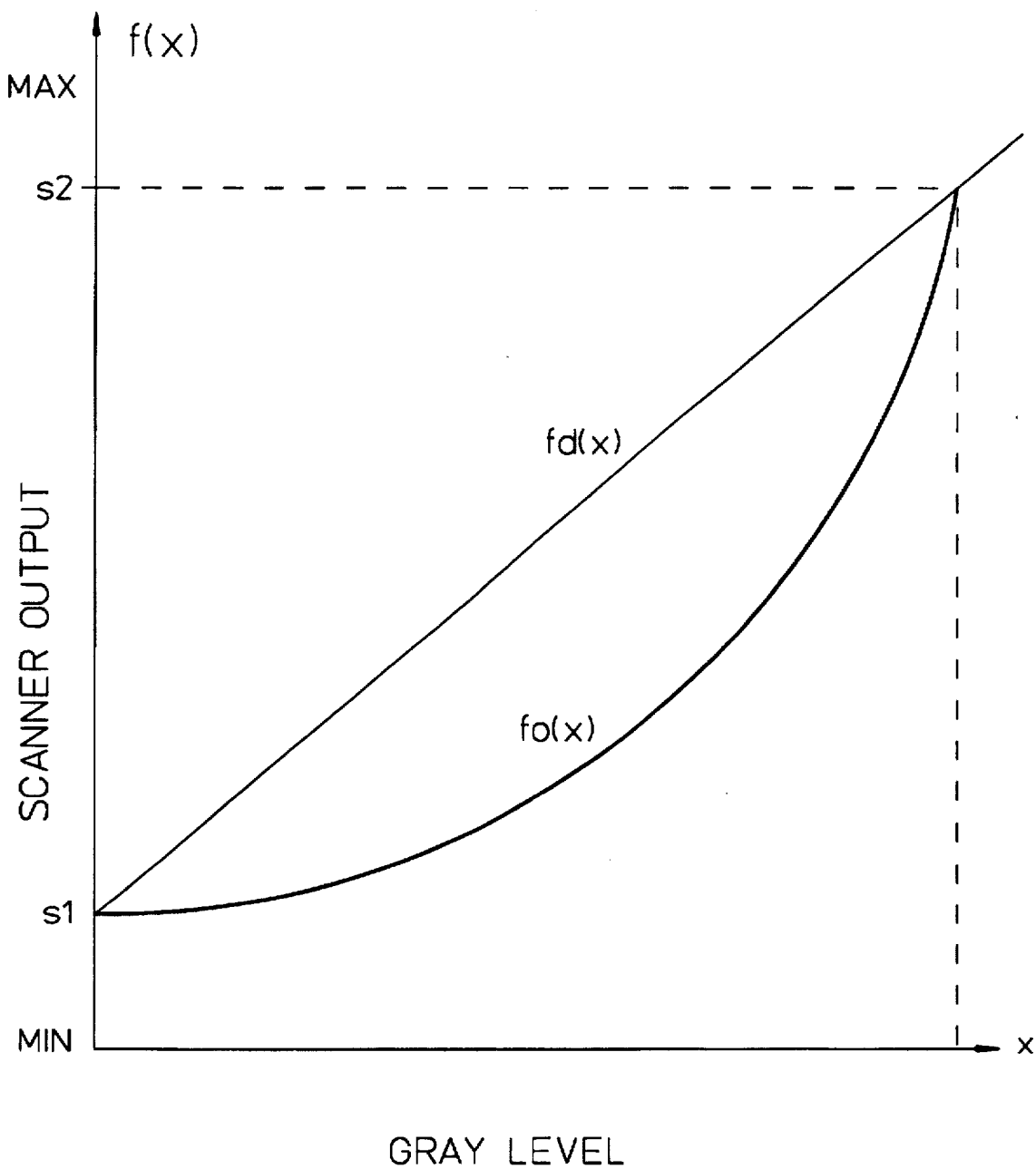
FIG. 15(a) is a graphical representation of the original tonal response of a dither matrix and a desired tonal response function linearized with respect to a subrange of scanner outputs.

In one embodiment, the desired tonal response function is chosen as a linear function between $s_1$ and $s_2$, as shown in FIG. 15(a). If the scanned document has a larger gamut than the printer can produce, a dither matrix generated from this mapping clips the out-of-gamut tones to $s_1$ or $s_2$, whichever is closer.

Figure 15B:
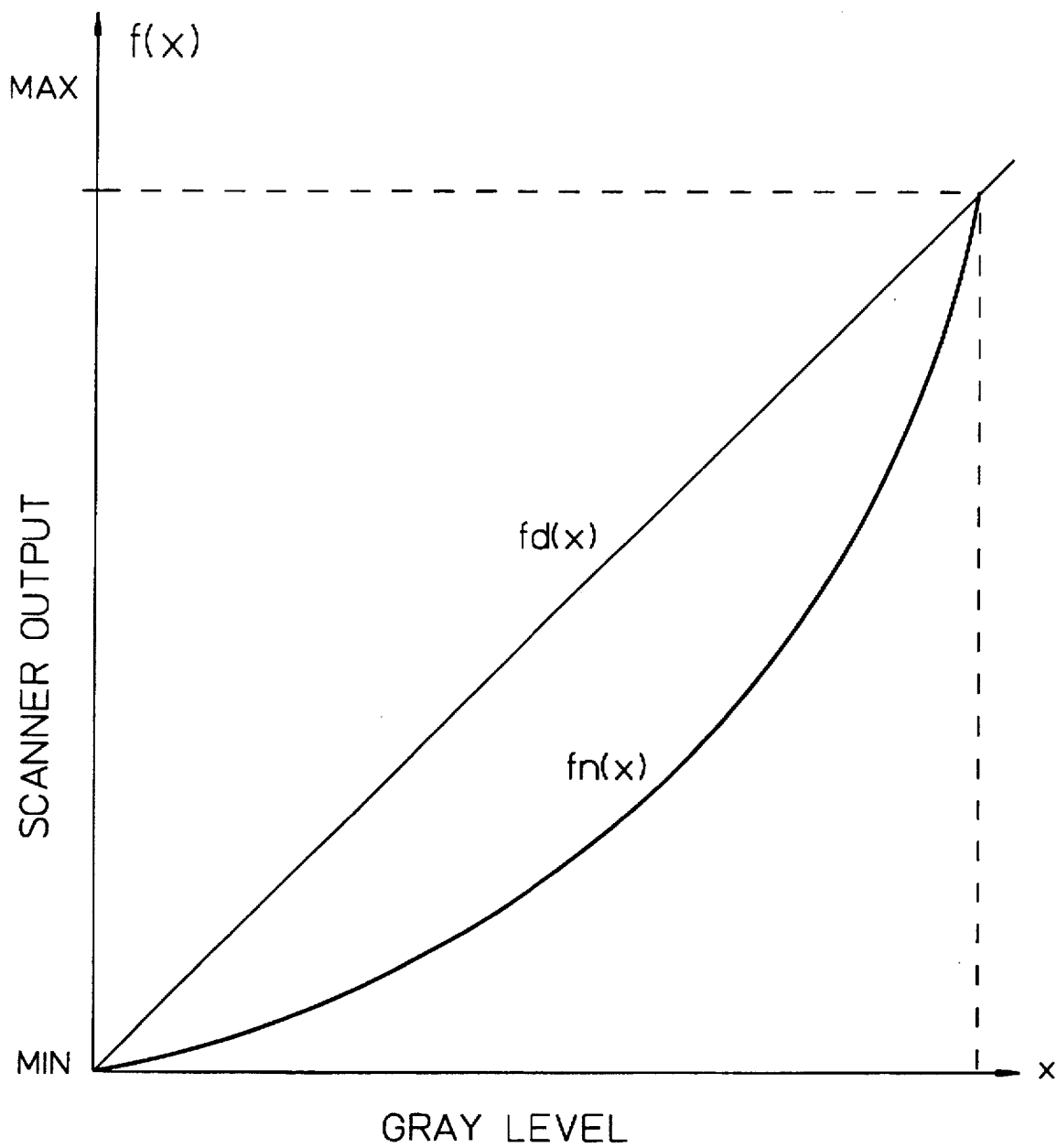
FIG. 15(b) is a graphical representation of the original tonal response of a dither matrix and a desired tonal response function linearized between a maximum and minimum scanner output.

Alternatively, the measured tonal response is chosen to be normalized to the range from min to max and the tonal response function linearized between min and max, as shown in FIG. 15(b). A matrix generated from this mapping will effectively do a linear compression of the document gamut to the range from $s_1$ to $s_2$. In-gamut tones in the scanned document are shifted slightly, but the relative tonal relationship is preserved.

In calibrating color printers, it is desirable to let the perceived color difference between adjacent input level be uniform. The first step in the calibration process is to generate a dither matrix that yields linear cumulative color difference as a function of input digital value. This solves the dot-gain problem, and increases the number of effective levels in a dither matrix.

In one embodiment of color printer dither matrix calibration the CIELAB color difference is used:

$$\Delta E = \sqrt{(\Delta L^*)^2 + (\Delta a^*)^2 + (\Delta b^*)^2}$$

Figure 16:
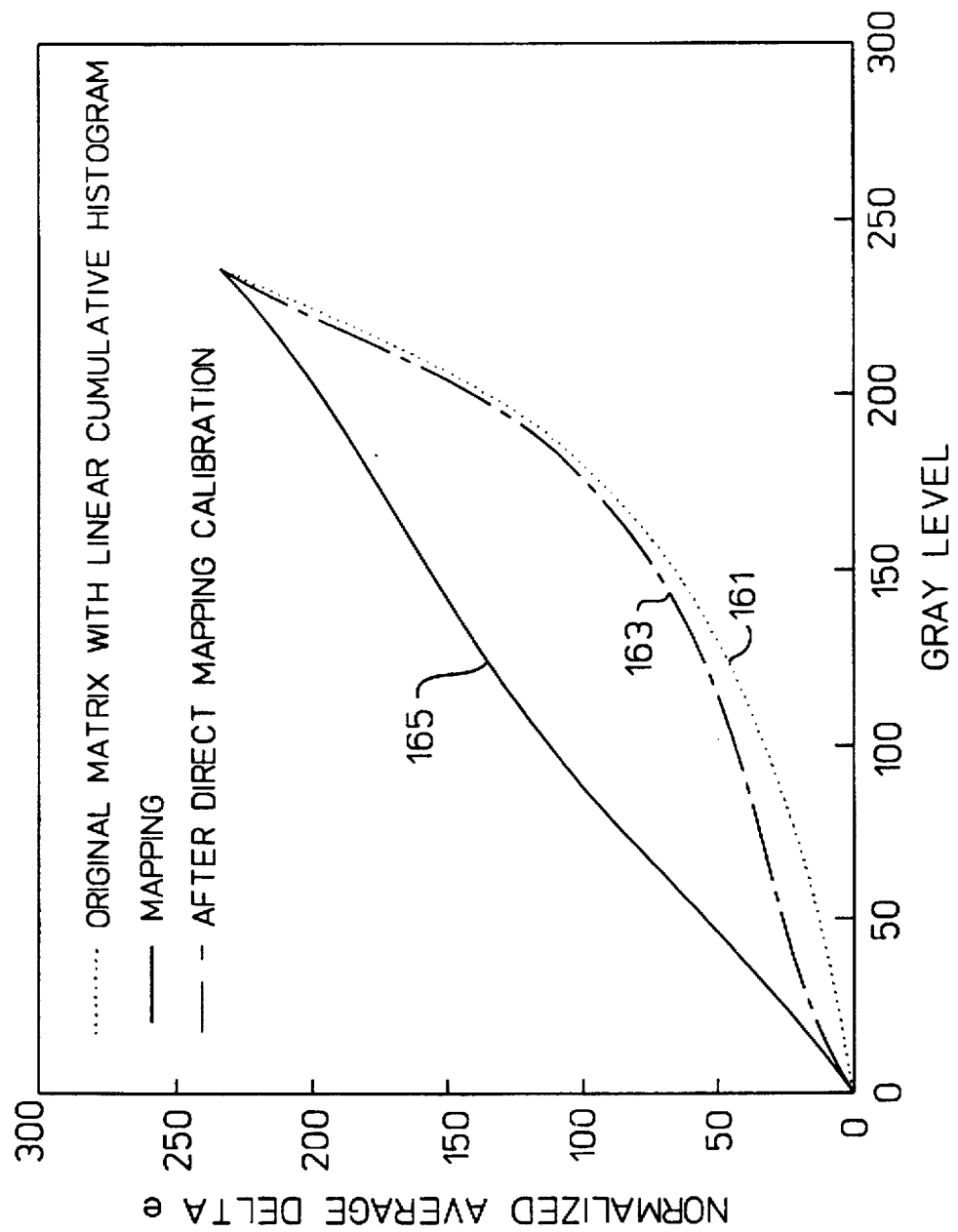
FIG. 16 is a graphical illustration of the calibration of a dither matrix for color halftone image rendering.

FIG. 16 is a graphical illustration of the calibration of a dither matrix for color halftone image rendering. An initial dither matrix is generated as discussed above and in U.S. Pat. No. 5,317,418 entitled "Halftone Images Using Special Filters", which is incorporated herein by reference. The original matrix uses a linear histogram.

The tonal measurement device 113 is operable to take L*a*b* measurements from a photospectrometer and compute cumulative color difference data. The curve 161 shows the ΔE using the original dither matrix. Color errors are large in highlight regions (large tone level), and small is shadow regions (small tone level). The curve 161 indicates the mapping function. Small adjustments to the cumulative color difference is made to reduce the correction required in the shadow regions in accordance with the behavior of color laser printer engines. The small deviation in the shadow regions is introduced intentionally because laser printers do not reproduce tones stably in shadow regions. For output devices with uniform reproduction of tones in all regions it is not necessary to make such adjustments.

Next the dither matrix threshold values are mapped to new values, as discussed above in conjunction with FIG. 9. Following mapping, the color errors are mostly uniform across the tone levels, as is illustrated by curve 165.

Other embodiments of the invention will be apparent to the skilled in the art from a consideration of this specification or practice of the invention disclosed herein. All publications cited in this specification are incorporated by reference. It is intended that the specification and examples be considered as exemplary only, with the true scope and spirit of the invention being indicated by the following claims.

We claim:

1. A method of generating a dither matrix calibrated to a desired tonal response, comprising:
   (a) generating a dither matrix with a predicted tonal response close to the desired tonal response;
   (b) measuring actual tonal response;
   (c) manipulating a cumulative histogram for said dither matrix in response to said actual tonal response; and
   (d) inputting said cumulative histogram to a dither generation program to generate a dither matrix that conforms to said cumulative histogram.

2. The method of claim 1 wherein step (c) comprises:
   (c.1) computing a difference between said tonal response and said desired tonal response;
   (c.2) using said difference to compute a modified cumulative histogram; and
   repeating steps (b) through (d) until said measured tonal response matches said desired tonal response.

3. The method of claim 2, wherein said step (a) comprises:
   using a model-based approach to compute a dither matrix having a tonal response approximating that of said desired tonal response.

4. The method of claim 3, wherein said model-based approach is a printer dot model.

5. The method of claim 1, wherein in step (b) tonal response is measured using at least one technique selected from the group consisting of a densitometer, digital output from a scanner, luminance measured with a spectrometer, luminance measured with a calorimeter, color differences obtained from processing CIE color specification measured using a spectrometer, and color differences obtained from processing CIE color specification measured using a colorimeter.

6. The method of claim 1, wherein step (c) comprises:
   (c.1) if the tonal response indicates that the output using the dither matrix is too dark, lowering the cumulative histogram; and
   (c.2) if the tonal response indicates that the output using the dither matrix is too light, raising the cumulative histogram.

7. The method of claim 1, wherein said calibrated dither matrix conforms to a desired tonal response function, $f_d(x)$ where x is a tone level, and wherein said dither matrix generated in step (a) has N×M threshold elements $t_{ij}$, wherein said dither matrix has a tonal response function $f_o(x)$ where x is a tone level, and wherein step (d) comprises:
   (d.1) for each threshold value a, for each $t_{ij}$ that has the value a, setting $t_{ij}$ to equal a value that is a function of a.

8. The method of claim 7, wherein
   said function of a is $f_d^{-1}[f_o(a)]$.

9. The method of claim 7 wherein $f_d(x)$ is linear and for each value a, for each $t_{ij}$ that has the value a, said function of a is $f_o(a)$.

10. The method of claim 7 wherein said actual tonal response has a range and further comprising:
    defining a range for the function $f_d$ to be a subset of said range of said actual tonal response.

11. The method of claim 1 wherein step (c) further comprises:
    (c.3) smoothing out discrete steps so that said cumulative histogram is a strictly monotonic cumulative histogram.

12. A method for operating a computerized device, said computerized device having a processor, a memory, means for measuring a tonal response function, means for inputting an image into said memory, and means for manipulating the contents of said memory, to generate a calibrated dither matrix such that said calibrated dither matrix conforms to a desired tonal response function, $f_d(x)$ where x is a tone level, comprising:
    (a) in said processor, generating an initial dither matrix having N×M threshold elements $t_{ij}$ and storing said initial dither matrix in said memory;
    (b) measuring a tonal response function $f_o(x)$ from said initial dither matrix, where x is a tone level; and
    (c) in said processor, for each threshold value a, for each $t_{ij}$ that has the value a, setting $t_{ij}$ to equal $f_d^{-1}$ thereby generating a second dither matrix and storing said second dither matrix in said memory;
    (d) in said processor, calculating the cumulative histogram of the second dither matrix;
    (e) in said processor, smoothing out discrete steps in said cumulative histogram to generate a strictly monotonic cumulative histogram; and
    (f) inputting said monotonic cumulative histogram to a dither matrix generation program executable on said processor to generate a calibrated dither matrix.

13. The method of claim 12 wherein said actual tonal response has a range and further comprising:
    defining a range for the function $f_d$ to be a subset of said range of said actual tonal response.

14. The method of claim 13 wherein the function $f_d$ is linear.

15. A system for generating calibrated dither matrices used in halftone printing, comprising:
    (a) a central processing unit operable to execute computer programs;
    (b) a memory connected to said central processing unit;
    (c) a dither matrix generation program loaded into said memory, operable to accept a cumulative histogram as input and operable to create a dither matrix conforming to said cumulative histogram;
    (d) a halftone output device connected to said central processing unit;
    (e) a tonal response measuring device connected to said central processing unit; and
    (f) a control program loaded into said memory and operable to:
        1. directing said dither matrix generation program to create an initial dither matrix;
        2. directing said halftone output device to output sample outputs for each continuous tone level;
        3. directing said tonal response measuring device to measure tonal response for each sample output;
        4. compiling said tonal response for each sample output to a tonal response function;
        5. comparing said tonal response function to a desired tonal response function and generating a modified cumulative histogram;
        6. directing said dither matrix generation program to use said modified cumulative histogram to generate a calibrated dither matrix.

16. A method for operating a computerized device, said computerized device having a processor, a memory, means for inputting an image into said memory, and means for manipulating the contents of said memory, to generate a calibrated dither matrix such that said calibrated dither matrix conforms to a desired tonal response function, $f_d(x)$ where x is a tone level and $f_d(x)$ is linear, comprising:

(a) in said processor, generating an initial dither matrix having N×M threshold elements $t_{ij}$ and storing said initial dither matrix in said memory;

(b) measuring a tonal response function $f_o(x)$ from said initial dither matrix, where x is a tone level;

(c) in said processor, for each threshold value a, for each $t_{ij}$ that has the value a, setting $t_{ij}$ to equal $f_d^{-1}$, thereby generating a second dither matrix and storing said second dither matrix in said memory;

(d) in said processor, calculating the cumulative histogram of the second dither matrix;

(e) in said processor, smoothing out discrete steps in said cumulative histogram to generate a strictly monotonic cumulative histogram; and (f) inputting said monotonic cumulative histogram to a dither matrix generation program executable on said processor to generate a calibrated dither matrix.

* * * * *